United States Patent [19]
Barpal

[11] 3,913,874
[45] Oct. 21, 1975

[54] VEHICLE CONTROL SYSTEM INCLUDING RESIDUE BREAKDOWN VOLTAGE ACROSS THE VEHICLE RAILS

[75] Inventor: Isaac R. Barpal, Pittsburgh, Pa.
[73] Assignee: Westinghouse Electric Corporation, Pittsburgh, Pa.
[22] Filed: Mar. 8, 1974
[21] Appl. No.: 449,590

[52] U.S. Cl. .......................................... 246/182 R
[51] Int. Cl.² ........................................ B61L 3/00
[58] Field of Search ............ 246/182 C, 182 R, 169, 246/167; 340/163, 171 R; 180/98

[56] References Cited
UNITED STATES PATENTS

| | | | |
|---|---|---|---|
| 3,387,064 | 6/1968 | Joy et al. ...................... | 246/169 X |
| 3,601,671 | 8/1971 | Little ............................. | 246/182 C |
| 3,699,521 | 10/1972 | Hughson ........................ | 340/171 R |
| 3,817,344 | 6/1974 | Asano et al. .................. | 180/98 |

*Primary Examiner*—Trygve M. Blix
*Assistant Examiner*—Douglas C. Butler
*Attorney, Agent, or Firm*—R. G. Brodahl

[57] ABSTRACT

A vehicle control system, wherein a vehicle travels along a running surface including one of running rails and signaling rails. A first transformer on the vehicle is connected to a pair of conductive elements such as brushes or the like which ride on the rails. A voltage is induced across the first transformer resulting in a voltage being impressed across the rails which is of a magnitude sufficient to breakdown any residue, for example rust on the track, such that wayside signals are shunted by the transformer under all environmental conditions, thereby indicating block occupancy to wayside equipment. A second transformer on the vehicle is connected to the rails in a similar manner for sensing the induced voltage in the rails as a way of checking that there is no failure in any of the circuit elements on the vehicle which are used for indicating block occupancy. In the event the impressed voltage is not sensed, a failure alarm is actuated and the vehicle propulsion controlling enable signal is interrupted. Each of the transformers has a low impedance relative to the frequency of the wayside information signals flowing in the rails, such that one winding on one or both of the transformers is utilized for sensing the wayside information signal flowing through the rails for controlling the speed of the vehicle.

10 Claims, 4 Drawing Figures

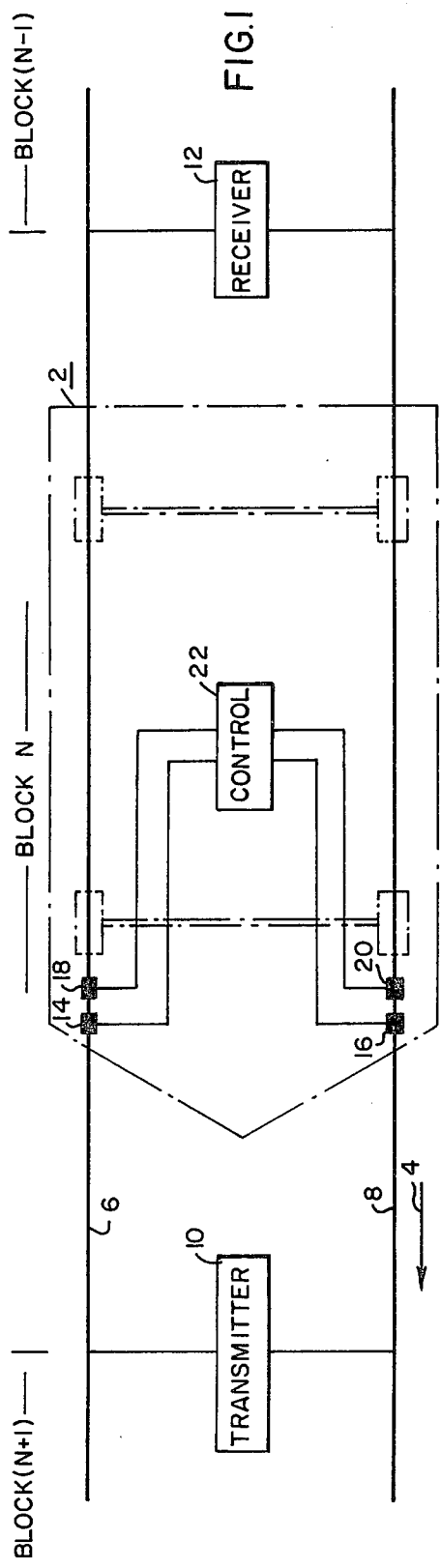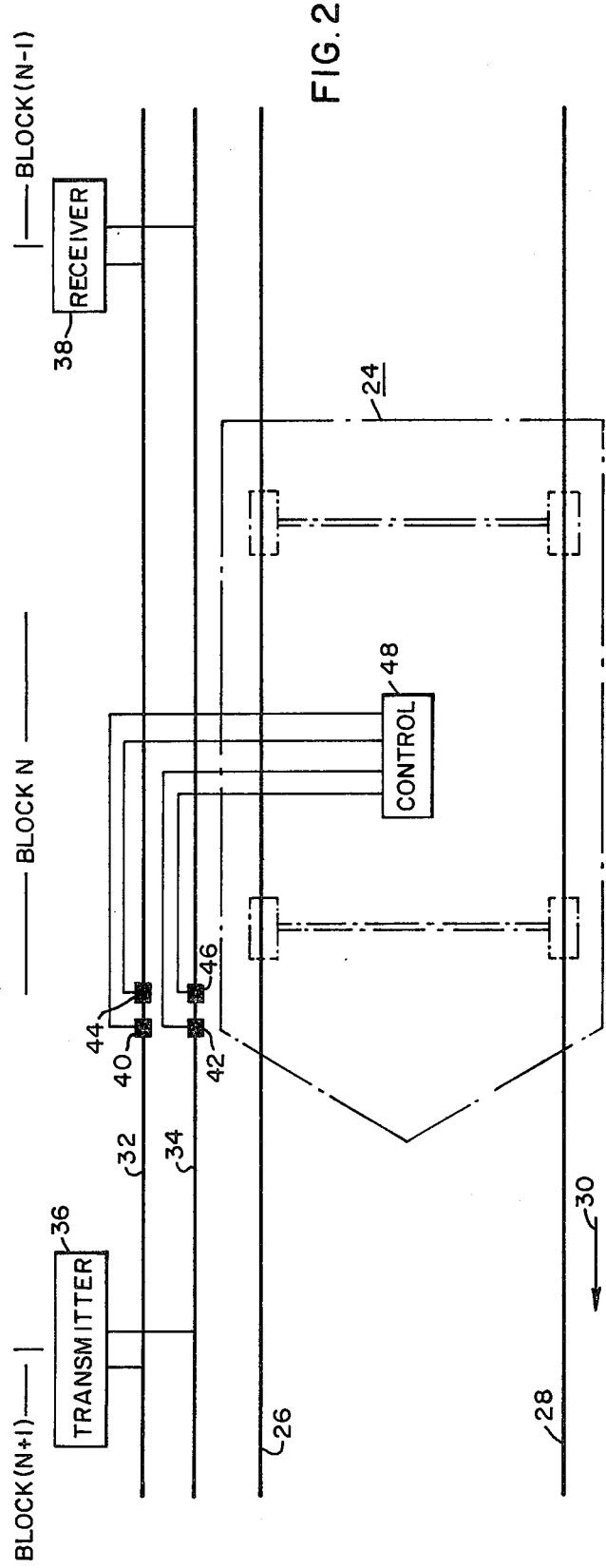

VEHICLE CONTROL SYSTEM INCLUDING RESIDUE BREAKDOWN VOLTAGE ACROSS THE VEHICLE RAILS

CROSS REFERENCE TO RELATED APPLICATIONS

Reference is made to the following U.S. Patents: "Remote Signaling of Control Signals", No. 3,551,889 filed May 11, 1967 on behalf of C. S. Miller; "Remote Transmission Of Control Signals", No. 3,562,712 filed May 11, 1967 on behalf of G. M. Thorne-Booth et al.; and "Control Of A Vehicle Along A Path Divided Into A Plurality Of Signal Blocks" No. 3,593,022 filed Sept. 25, 1968 on behalf of R. C. Hoyler et al. Each of the referenced U.S. Patents is assigned to the assignee of the present invention.

BACKGROUND OF THE INVENTION

In any vehicle system, there is a problem associated with the degree of coupling between the vehicle antennas and the wayside antennas which transmit vehicle information signals such as speed commands to the vehicle. The degree of coupling between the respective antennas depends on the inflation of the tires in a rubber tire system, and the amount of wear on the wheels and the tracks in a steel wheel system. Both systems have a common problem relative to the degree of coupling varying due to track or surface irregularities encountered as the vehicle travels along the running surface. This in turn results in difficulty related to properly setting threshold levels within the signal receivers on the vehicle associated with the vehicle antennas.

Another general problem area is in determining block occupancy when such occupancy is determined by the vehicle shunting the wayside signals flowing in the running rails or signal rails, when the vehicle is present in a given track circuit signaling block. Specifically, the rails may have residue such as rust or other corrosion formed thereon which results in high impedance between the rails and the vehicle shunt, such that vehicle presence may not readily be detectable.

The apparatus according to the present invention replaces the vehicle antennas as described above by providing conductive elements which ride on the rails for sensing the wayside signals, thereby eliminating the coupling difficulty as set forth above. Also, the apparatus according to the present invention provides a high voltage to the conductive elements which breaks down the residue on the rails, thereby reducing the shunt impedance between the rails and the conductive elements such that block occupancy is readily ascertainable.

SUMMARY OF THE INVENTION

According to the present invention, a vehicle control system is disclosed, wherein a vehicle travels along a running surface including one of running rails and signaling rails, with the running surface being divided into a plurality of signaling blocks. There are means for inducing an information signal into a given one of the signaling blocks, and there are means on the vehicle for inducing a voltage across the rails which has a magnitude at least equal to the magnitude of the breakdown voltage required for breaking down any residue present on the rails, including means for sensing the information signal. there are also means on the vehicle responsive to the information signal being sensed for controlling the vehicle, and there are further means on the vehicle for sensing the voltage induced across the rails, including means for signaling a failure condition in response to sensing the absence of the induced voltage for a predetermine time interval.

BRIEF DESCRIPTION OF THE DRAWINGS

FIG. 1 is a schematic representation of a vehicle control system wherein the vehicle running surface includes running rails;

FIG. 2 is a schematic representation of a vehicle control system wherein the vehicle running surface includes signaling rails;

DESCRIPTION OF THE PREFERRED EMBODIMENT

Figure 3:
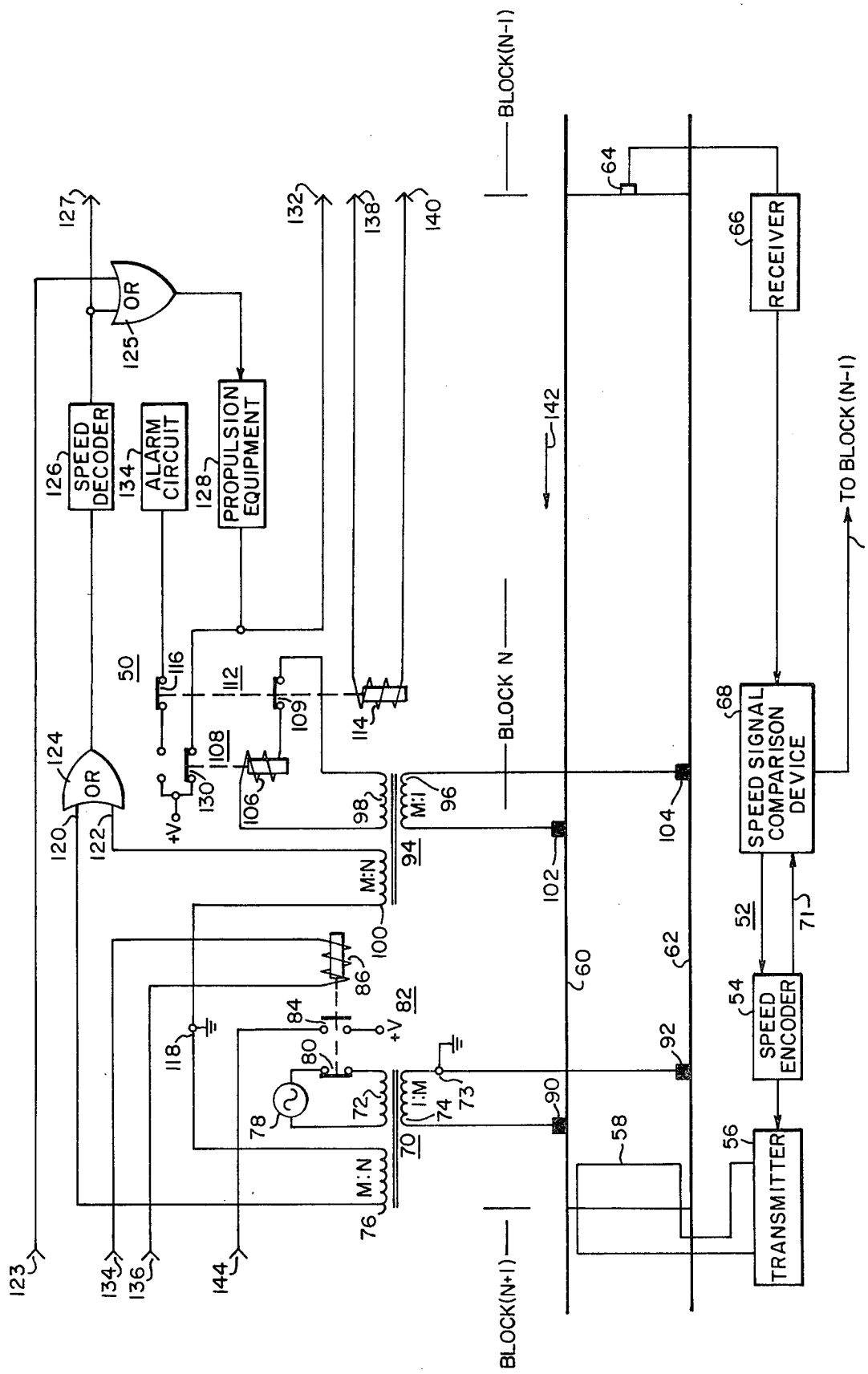
FIG. 3 is a schematic and block diagram representation of a vehicle control system for a single vehicle car according to the present invention.

In reference to FIG. 1, a vehicle 2 (shown in phantom) travels, in a direction as illustrated by the arrow 4, along a running surface comprising a pair of running rails 6 and 8. It is seen that this is a conventional steel rail, steel wheel system, which may be of the insulated joint type or the conductive and continuous rail type. The circuitry illustrated in this and following drawings is directed to a continuous rail system, and it is to be appreciated that only minor design changes are required to practice the invention in an insulated joint system. The running surface is divided into a plurality of signaling blocks such as the block N illustrated, with a portion of a block (N−1) shown partially on the rightmost portion of the figure, and block (N+1) illustrated partially on the leftmost portion of the figure. A signal transmitter 10 induces an information signal, such as a vehicle speed command signal, into the running rails 6 and 8. If a vehicle is not present in the signaling block N, a receiver 12 senses the induced information signal at a predetermined signal level which is indicative of the signaling block N being unoccupied by a vehicle. On the other hand, when a vehicle is present in the block N as illustrated by the vehicle 2, the information signal induced into the running rails by the transmitter 10 are shunted by either one of a pair of conductive elements 14 and 16, or 18 and 20 through a control device 22 thereby substantially reducing the signal sensed by the receiver 12, thereby indicating block occupancy. The control device 22 includes means for impressing a relatively high voltage across the conductive elements 14 and 16 which voltage is of a magnitude sufficient to breakdown any residue such as rust or the like formed on the track, thereby providing a low impedance path through the control device 22 for providing the vehicle shunt. The brushes 18 and 20 sense the high voltage induced in the rails by the conductive elements 14 and 16 for determining that the shunting system is operating correctly, such that the vehicle presence is detectable. In the event there is a failure in any of the conductive elements or the associated circuitry in the control device 22 an alarm is actuated and the vehicle is braked, and a physical short such as a shorting bar is dropped across the running rails 6 and 8 such that the information signal flowing in the rails is shunted thereby indicating to the continued block occupancy to the wayside equipment. This will be explained in more detail shortly.

Referring now to FIG. 2 which illustrates a vehicle 24 which rides on running surfaces 26 and 28. The vehicle 24 travels in the direction of the arrow 30 and may be a rubber tired vehicle, a magnetically suspended vehicle, an air cushioned vehicle or the like. Accordingly, vehicle presence in any one of a plurality of signaling blocks must be detected by the use of signaling rails or the like. A pair of signaling rails 32 and 34 are illustrated along the running surface for the vehicle 24. The running surface and signaling rails are divided into a plurality of signaling blocks such as the block N, the block (N−1) illustrated on the rightmost portion of FIG. 2, and a block (N+1) illustrated on the leftmost portion of FIG. 2. A signal transmitter 36 induces information signals such as speed commands into the block N for controlling the speed of any vehicle therein as well as for being shunted to indicate block occupancy. In the event a vehicle is not present within the signaling block N, a signal receiver 38 senses the information signal at a predetermined level which is indicative of the signaling block N being unoccupied. On the other hand, if a vehicle is present within the signaling block N, as illustrated, the information signal is shunted by the conductive elements 40 and 42 or the conductive elements 44 and 46 by way of a control device 48 which provides a low impedance shunt to the information signal. Accordingly, the receiver 38 senses an information signal level at a substantially reduced level which is indicative of block occupancy. The control device 48 provides a relatively high voltage across the elements 40 and 42 which is of a magnitude sufficient to breakdown any residue such as rust or the like on the signaling rails 32 and 34, thereby insuring a low impedance shunt. The conductive elements 44 and 46 sense the high voltage induced in the running rails to insure proper operation of the shunt system. In the event of any failure of the conductive elements or the associated circuit elements in the control device 48 an alarm is actuated and the vehicle is braked, as well as another physical shunt being placed between the running rails 32 and 34 to indicate block occupancy to the receiver 38.

FIG. 3 illustrates a vehicle control system according to the present invention. A control device 50 may in practice be used as the control device 22 or 48 as illustrated in FIGS. 1 and 2, respectively. A wayside vehicle control system 52 is illustrated, and in practice may take the form of the system as disclosed in referenced U.S. Pat. No. 3,593,022. It is to be appreciated, however, that the present invention may be practical with other wayside vehicle control systems. A speed encoder 54 which may take a physical form as illustrated in referenced U.S. Pat. No. 3,551,889 provides an information signal such as a vehicle speed command to a transmitter 56 which energizes an antenna 58 for inducing a vehicle speed command in running rails 60 and 62 in a signaling block N. A signal responsive device such as a coil 64 senses the speed signal flowing in the running rails and provides a signal input to a signal receiver 66 which in turn transmits the received signal to a speed signal comparison device 68. If the speed signal received from the receiver 66 corresponds with the speed signal transmitted by the speed encoder 54 over a line 71 to the speed signal comparison device 68, the speed code is continuously transmitted to the vehicle block N. In the event of no comparison, which is indicative of a system failure or the presence of a vehicle in the block N, the signal comparison device provides a signal output on line 69 to the block (N−1) which is indicative of the block N being occupied.

The control device 50 includes a first inpedance means such as a transformer 70 which includes a primary winding 72, a secondary winding 74 and a tertiary winding 76. One side of the secondary winding 74 is connected to ground, as indicated at 73, for providing a fail-safe means of grounding the vehicle to the return rail. A source of voltage 78, for example 115 volts at 60 hertz is connected across the primary winding 72 by way of a contact 80 of a relay 82 which includes a second contact 84 and a coil 86. The turns ratio between the primary winding 72 and the secondary winding 74 is $1:m$, where $m$ is greater than unity and for example may be on the order of 10, such that the voltage induced across the secondary winding 74 is on the order of 1150 volts. The amount of actual secondary voltage required is normally ascertained by measuring the impedance of the rails with the corrosive element, such as rust, present. The turns ratio between the secondary winding 74 and the tertiary winding 76 is on the order of $m:n$ where $n$ in practice may be on the order of 1 or 2. The secondary winding 74 has one end thereof connected to a conductive element 90 and the other end thereof connected to a second conductive element 92. The elements 90 and 92 may take the form of brushes or shoes which ride on the rails 60 and 62 in a well known manner, and in practice may be formed of carbon, copper or the like. A second impedance means such as a transformer 94 has a primary winding 96, a secondary winding 98 and a tertiary winding 100. The primary winding 96 has one end thereof connected to a conductive element 102 and the other end of the winding 96 is connected to a second conductive element 104. The elements 102 and 104 are similar to the elements 90 and 92. The coil 106 of a relay 108 is connected across the winding 98 through a contact 109 of a relay 112 having a coil 114 and a second contact 116. One end of the winding 76 and 100 of the transformers 70 and 94, respectively are connected to circuit ground at a terminal 118. The other ends of the windings 76 and 100 are connected to first and second inputs 120 and 122, respectively, of an OR gate 124, the output of gate 124 is connected to the input of a speed decoder 126, which has its output connected to propulsion equipment 128 by way of OR gate 125 and to a terminal 127. A second input to gate 125 is from a terminal 123 when the car illustrated is a following car in a multi-car vehicle. This is seen in relation to FIG. 4. A second input to the propulsion equipment 128 is from a source of voltage +V through a contact 130 of the relay 108, or from a voltage input terminal 132. An alarm circuit 134 is connected to the source of voltage +V through contacts 130 and 116 dependent upon the energization states of the relays 108 and 112. The relay coil 86 of relay 82 receives an energization signal across terminals 134 and 136, and the relay coil 114 of relay 112 receives energization signals across the terminals 138 and 140. How the coils 86 and 114 are energized will be explained in relation to FIG. 4.

Consider that the coils 86 and 114 are deenergized at this time, and their respective relay contacts are in the positions shown. The source 78 therefore provides voltage to the primary winding 72 of the transformer 70 which voltage is stepped up across the secondary winding 74 providing a voltage across the conductive elements 90 and 92 which has a magnitude sufficient to breakdown any rust or corrosion formed on the rails 60 and 62, respectively. The voltage induced across the rails 60 and 62 is then sensed across the conductive elements 102 and 104 such that the sensed voltage is impressed across the primary winding 96 of the transformer 94. This voltage is stepped down by the secondary winding 98, causing current to flow through the closed contact 109 of the relay 112 and through the coil 106 of the relay 108 energizing same. The relay 108 is of the delay type such that the relay is not denergized unless there is absence of current flow through the coil 106 for a time interval on the order of two-thirds of a second or so, such that the system doesn't respond to intermittent indications. The deenergization of relay 108 is then indicative of the absence of voltage being produced across the transformer 94 for one reason or another. With the relay 108 being energized the contact 130 is in the position shown and a +V enable signal is provided to the propulsion equipment 128 which is indicative of it being safe for the vehicle to proceed along the vehicle running surface. Assume that the relay 108 is deenergized due to the voltage impressed across the rails no longer being sensed. In this instance, the contact 130 switches positions and the voltage +V is applied through the contact 130, the contact 116 of the realy 114 to an alarm circuit 134 which indicates a failure condition in the system. Since the contact 130 has changed positions an enable signal is no longer provided to the propulsion equipment 128 and tractive effort is no longer provided by the vehicle, and the vehicle is braked. Also, a shorting bar (not shown) or the like is dropped from the vehicle across the rails 60 and 62 to shunt the information signal flowing therein such that the receiver 66 continues to sense the absence of a signal, which is indicative of the vehicle block N being continuously occupied. This is a fail-safe consideration in that the relay 108 being deenergized is indicative of a failure in the transformer 70, or the transformer 94, or one of the conductive elements 90, 92, 102, 104 or their associated connections.

The transformers 70 and 94 also function to sense the speed signal flowing through the rails 60 and 62 for controlling the speed of the vehicle. If the vehicle is traveling in the direction of the arrow 142 the speed signal is conducted or shunted through the winding 74 of the transformer 70 and is induced into the winding 76 and is provided as a signal input to the input 120 of the OR gate 124 which provides the sensed speed signal to the decoder 126 which decodes same for providing a speed reference to propulsion equipment 128 by way of OR gate 125. In practice the decoder 126 may be of the type illustrated in previously referenced U.S. Pat. No. 3,562,712. In the event the vehicle is traveling in the opposite direction the speed command signal would first flow through the winding 96 of the transformer 94 and be induced in the winding 100 and in turn be applied to the input 122 of the OR gate 124 with the speed signal then being provided to the input of the decoder 126 and in turn as a speed reference signal to the propulsion equipment 128. The speed reference signal appearing at the output of decoder 126 is also applied to a terminal 127 for application to a following vehicle car as is shown in relation to FIG. 4.

The speed signal flowing in the rails is usually an audio signal and may for example be on the order of 5 to 10 kilohertz. It is seen therefore that the frequency of the speed signal is much higher than the frequency of the voltage signal provided by the alternating current source 78. The impedance of the transformers 70 and 94 is chosen or tuned by capacitive means or the like to be high with respect to the frequency of the source 78, and to be low with respect to the frequency of the speed signal. This is so since the magnitude of the speed signal may be on the order of 12 volts whereas as was previously explained, the voltage output from the source 78 and the stepped up voltage appearing across the tracks is much, much higher.

An enable signal is provided to an output terminal 144 from a source +V through the contact 84 of relay 82 whenever the coil 86 is energized which is indicative of more than one vehicle car being used. If more than one vehicle car is used the terminal 144 is coupled to the terminal 132 in the car to which the terminal 144 is coupled. In other words, if there is more than one car used an enable signal would be provided from the following car to the terminal 132 illustrated for enabling the propulsion equipment 128. In such an instance, the relay 112 on the car illustrated would be energized at the terminals 138 and 140 thereby disabling the relay 108. This will be described in more detail in relation to FIG. 4 as follows.

Figure 4:
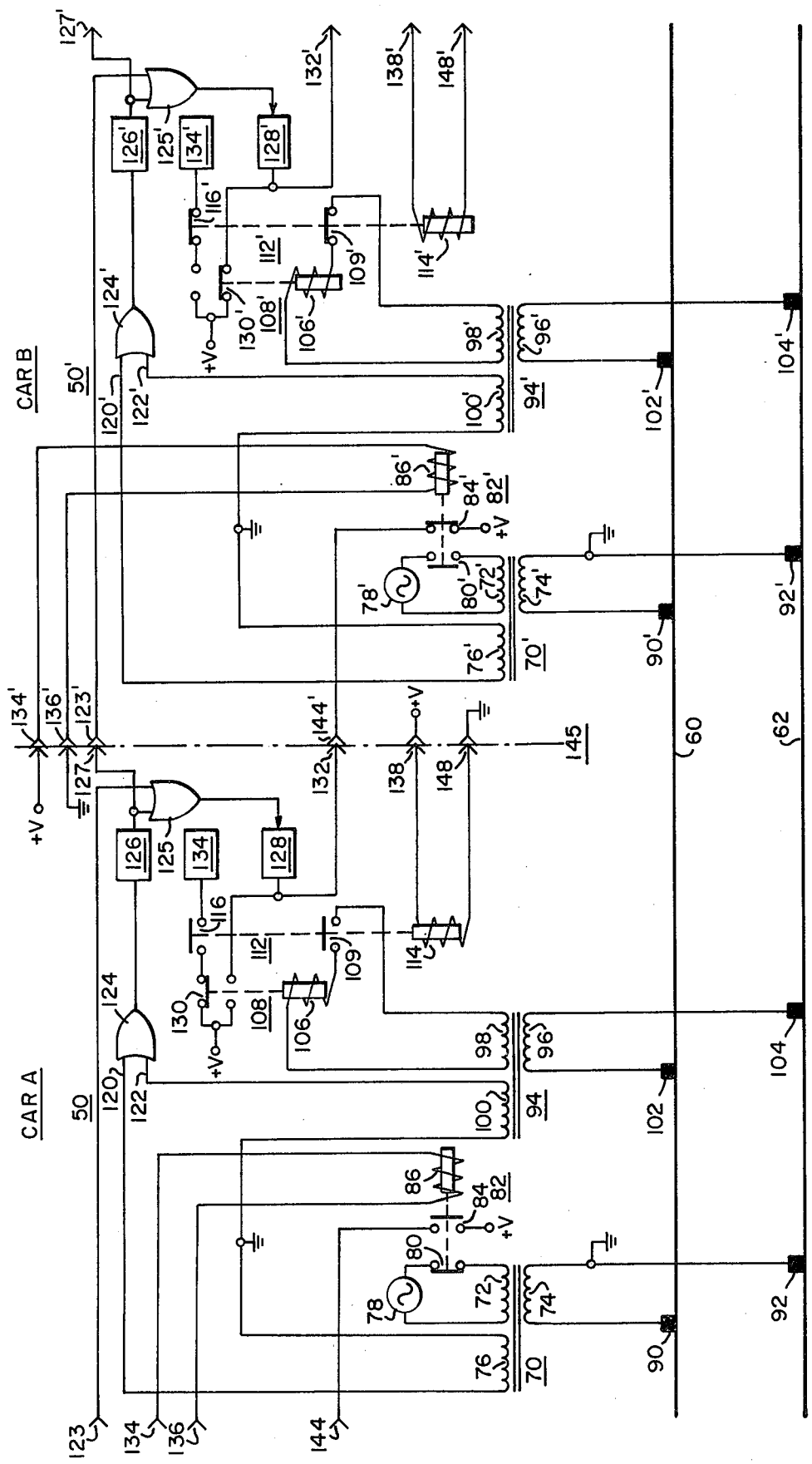
FIG. 4 is a schematic diagram representation illustrating the physical connection of the vehicle control system of FIG. 3 between two vehicle cars in a multiple car vehicle system.

Refer now to FIG. 4 which illustrates a vehicle having two vehicle cars, namely car A and car B. Circuit elements in car B are given the same numeral designation as like elements in car A, with a prime affixed thereto. A high voltage from the source on car A is impressed across the rails, and this high voltage is sensed by car B to assure circuit continuity and fail-safe ground between both vehicle cars and the return rail. Since this is so, the alarm circuit in car A is deactivated, whereas the alarm circuit in car B is activated. The speed command signal flowing in the rails is shunted by car A as long as car A is within a given vehicle block, and once car A leaves this vehicle block the speed signal is shunted by car B, which assures an indication of block occupancy as long as one of the vehicle cars in the multi-car vehicle is present within the given signaling block.

On vehicle car A relay 82 is deenergized since coil 86 receives no energization potential between terminals 134 and 136 since car A is the lead car and is not coupled to another car at the front end thereof. Accordingly, contact 80 is in the position shown and voltage from the source 78 is applied across the primary winding 72 of transformer 70 inducing voltage in the secondary winding 74 and in turn across the conductive elements 90 and 92 which impresses the voltage across the tracks 60 and 62. As was previously explained the speed signal flowing in the rails 60 and 62 flows through the winding 74 thereby shunting the signal with respect to the receiver 66 (see FIG. 3) thereby indicating block occupancy. This speed signal is induced in the windng 76 and is coupled to the input 120 of the OR gate 124 and in turn to the speed decoder 126 which in turn provides a speed reference signal to output terminal 127 and propulsion equipment 128. Since car A is coupled to car B terminal 138 has a voltage +V applied thereto which causes current flow through coil 114 opening contacts 109 and 116 of relay 112. The opening of contact 109 interrupts the current path for the secondary winding 98 which normally senses the voltage impressed across the rails 60 and 62. The contact 130 therefore opens and the alarm circuit 134 is deactivated due to contact 116 being open. As will be explained shortly, the alarm circuit 134' in car B is activated so an alarm condition is still manifested in case an alarm condition occurs. The opening of contact 130 removes the enable signal from the input to the propulsion equipment 128, however an enable signal is provided from the terminal 132 as will be explained shortly.

The coupling of car B to car A provides a voltage +V to the terminal 134' which energizes the coil 86' of relay 82' causing contact 80' thereof to move to an open condition as illustrated, such that the source 78' is unable to impress voltage across the primary winding 72' of the relay 70'. It is to be remembered however that voltage has already been impressed across the rail 60 and 62 from the relay 70 of car A as was previously explained. The closing of contact 84' provides a +V voltage to the terminal 144' through the coupler 145 to the terminal 132 of car A which provides an enable signal for the propulsion equipment 128 in car A. Since car B is not coupled to a following car there is no voltage impressed between the terminals 138' and 148' and therefor there is no energization potential applied to the coil 114 of relay 112', therefore contacts 109' and 116' thereof are in the positions illustrated. Primary winding 96' of transformer 94' senses the impressed voltage between the tracks 60 and 62 by way of the contact of conductive elements 102' and 104' therewith. This voltage induces a voltage in the secondary winding 98' and causes current to flow through coil 106' causing contact 130' to close as illustrated, applying the +V enable signal to propulsion equipment 128'. The speed signal sensed by winding 74 of transformer 70 in car A which is coupled to OR gate 124 is provided to the speed decoder 126 and in turn to terminal 127 through the coupler to terminal 123' to an input of the OR gate 125' in car B as a speed reference signal for propulsion equipment 128' in car B.

It is seen therefore that in a multiple car vehicle as illustrated, the alarm circuit in the tail end vehicle car (CAR B) is activated thereby insuring the sensing of the impressed voltage between the rails from the lead car (CAR A) to the tail end car (CAR B), as long as the circuit elements in each car are functioning properly. The shunting of the speed signal from the signaling block receiver is assured, since the conductive elements riding on the rails from each car are actively in contact with the rails as long as one of the vehicle cars in the multiple car vehicle is present within the given signaling block.

In summary a vehicle control system has been disclosed wherein a vehicle travels along a running surface, including one of running rails and signaling rails, with the running surface being divided into a plurality of signaling blocks. An information signal, such as a speed signal is induced into a given one of the signaling blocks. There are means on the vehicle for inducing voltage across the rails which has a magnitude at least equal to the magnitude of the breakdown voltage required for breaking down any residue present on the rails, including means for sensing the induced information signal. There are means on the vehicle responsive to the information signal being sensed for controlling the speed of the vehicle, and there are also included means on the vehicle for sensing the voltage induced across the rails, including means for signaling a failure condition in response to sensing the absence of the induced voltage for a predetermined time interval.

I claim:

1. In a vehicle control system, wherein a vehicle travels along a running surface, including one of running rails and signaling rails, and with said running surface containing an information signal for controlling the operation of said vehicle, the combination comprising:
    means on said vehicle for impressing a voltage across said rails which has a predetermined magnitude required for breaking down residue present on said rails and greater than the magnitude of said information signals; and
    means on said vehicle for sensing said voltage impressed across said rails, including means for signaling a failure condition in response to sensing the absence of said impressed voltage for a predetermined time interval.

2. In a vehicle control system, wherein a vehicle travels along a running surface, including one of running rails and signaling rails, the combination comprising:
    a source of voltage on said vehicle;
    a first transformer on said vehicle having a primary winding connected to said source of voltage, and also having a secondary winding;
    first and second conductive elements, with said first conductive element riding on a first one of said rails and also being connected to one end of the secondary winding of said first transformer, with said second conductive element riding on a second one of said rails and also being connected to the remaining end of the secondary winding of said first transformer;
    a second transformer on said vehicle having primary and secondary windings;
    third and fourth conductive elements, with said third conductive element riding on said first one of said rails and also being connected to one end of the primary winding of said second transformer, with said fourth conductive element riding on said second one of said rails and also being connected to the remaining end of the primary winding of said second transformer; and
    a signal utilization means connected across the secondary winding of said second transformer.

3. The combination claimed in claim 2 including:
    means responsive to said signal utilization means being energized for providing an enable signal for permitting said vehicle to travel along said running surface, and being responsive to said signal utilization means being deenergized for braking said vehicle.

4. In a vehicle control system, wherein a vehicle travels along a running surface, including one of running rails and signaling rails, with said running surface being divided into a plurality of signaling blocks, the combination comprising:
    means for inducing an information signal into a given one of said signaling blocks;
    means on said vehicle for inducing a voltage across said rails which has a predetermined magnitude in accordance with the breakdown voltage required for breaking down residue present on said rails, including means for sensing said information signal;
    means on said vehicle responsive to said information signal being sensed for controlling said vehicle; and means on said vehicle for sensing said voltage induced across said rails, including means for signaling a failure condition in response to sensing the absence of said induced voltage for a predetermined time interval.

5. In a vehicle control system, wherein a vehicle travels along a running surface, including one of running rails and signaling rails, with said running surface being divided into a plurality of signaling blocks, the combination comprising:

a source of voltage on said vehicle for producing a voltage having a given magnitude and frequency;

means for inducing an information signal into a given one of said signaling blocks, with said information signal having a high frequency and a low magnitude with respect to the voltage produced by said source;

a first impedance means located on said vehicle and coupled to said source of voltage and also being coupled to said rails for inducing a voltage therein having a magnitude at least equal to the breakdown voltage required for breaking down any residue present on said rails;

a second impedance means located on said vehicle and coupled to said rails for sensing said voltage induced therein;

at least one of said first and second impedance means including means for sensing said information signal;

means responsive to one of said first and second impedance means sensing said information signal for controlling said vehicle; and means responsive to said second impedance means sensing the absence of said voltage induced in said rails for a given time interval for signaling a failure condition.

6. In a vehicle control system, wherein a vehicle travels along a running surface, including one of running rails and signaling rails, with said running surface being divided into a plurality of signaling blocks, the combination comprising:

a source of voltage on said vehicle for producing a voltage having a given magnitude and frequency;

means for inducing an information signal into a given one of said signaling blocks, with said information signal having a high frequency and a low magnitude with respect to the voltage produced by said source;

a first impedance means located on said vehicle and coupled to said source of voltage and also being coupled to said rails for inducing a voltage therein having a magnitude at least equal to the magnitude of the breakdown voltage required for breaking down any residue present on said rails, and for sensing said information signal induced in said rails, with said first impedance means having a high impedance with respect to the frequency of said source and having a low impedance with respect to the frequency of said information signal;

a second impedance means located on said vehicle and coupled to said rails for sensing said voltage induced therein and said information signal induced therein, with said second impedance means having a high impedance with respect to the frequency of said source, and having a low frequency with respect to said information signal;

means responsive to one of said first and second impedance means sensing said information signal for controlling said vehicle; and means responsive to said second impedance means sensing the absence of said voltage induced in said rails for a predetermined time interval for signaling a failure condition.

7. The combination claimed in claim 6 wherein said first and second impedance means each comprise transformers having at least two windings.

8. In a vehicle control system, wherein a vehicle travels along a running surface, including one of running rails and signaling rails, with said running surface being divided into a plurality of signaling blocks, the combination comprising:

a source of voltage on said vehicle for producing a voltage having a given magnitude and frequency;

means for inducing a speed signal into a given one of said signaling blocks, with said speed signal having a high frequency and a low magnitude with respect to the voltage produced by said source;

a first transformer on said vehicle having a first winding connected to said source of voltage, and also having a second and third winding, with the impedance of said first transformer being high with respect to the frequency of the voltage produced by said source, and having a low impedance with respect to the frequency of said speed signal;

first and second conductive elements, with said first conductive element riding on a first one of said rails and also being connected to one end of the second winding of said first transformer, with said second conductive element riding on a second one of said rails and also being connected to the remaining end of the second winding of said first transformer;

a second transformer on said vehicle having first, second and third windings, with the impedance of said second transformer being high with respect to the frequency of the voltage produced by said source, and having a low impedance with respect to the frequency of said speed signal;

third and fourth conductive elements, with said third conductive element riding on said first one of said rails and also being connected to one end of the first winding on said second transformer, with said fourth conductive element riding on said second one of said rails and also being connected to the remaining end of the first winding on said second transformer;

a first signal utilization device connected across the second winding of said second transformer for sensing the voltage induced therein by the voltage induced into said rails by said source; and a second signal utilization device connected to the third winding of one of the first and second transformers for sensing the speed signal induced therein.

9. The combination claimed in claim 8, including means for controlling the speed of said vehicle in accordance with the speed signal sensed by said second signal utilization means.

10. The combination claimed in claim 8, including means for braking said vehicle in response to said first signal utilization means sensing the absence of said induced voltage.

* * * * *